United States Patent
Callens et al.

(10) Patent No.: US 11,420,379 B2
(45) Date of Patent: Aug. 23, 2022

(54) METHOD FOR HOT-FORMING A THERMOPLASTIC MATERIAL AND IMPLEMENTATION FACILITY

(71) Applicant: Centre Technique des Industries Mécaniques, Senlis (FR)

(72) Inventors: Clément Callens, Ligné (FR); Alain Lagoutte, Montagny-lès-Buxy (FR); Philippe Capon, Chalon-sur-Saone (FR); Elise Dreano, Nantes (FR); Karim Curtheley, Sainte-Hélène (FR)

(73) Assignee: CENTRE TECHNIQUE DES INDUSTRIES MECANIQUES

( * ) Notice: Subject to any disclaimer, the term of this patent is extended or adjusted under 35 U.S.C. 154(b) by 468 days.

(21) Appl. No.: 15/507,291

(22) PCT Filed: Sep. 18, 2015

(86) PCT No.: PCT/FR2015/052510
§ 371 (c)(1),
(2) Date: Feb. 28, 2017

(87) PCT Pub. No.: WO2016/042276
PCT Pub. Date: Mar. 24, 2016

(65) Prior Publication Data
US 2017/0259489 A1 Sep. 14, 2017

(30) Foreign Application Priority Data
Sep. 18, 2014 (FR) ........................................ 1458839

(51) Int. Cl.
*B29C 51/42* (2006.01)
*B29C 51/02* (2006.01)
(Continued)

(52) U.S. Cl.
CPC .......... *B29C 51/421* (2013.01); *B29B 13/023* (2013.01); *B29C 51/02* (2013.01);
(Continued)

(58) Field of Classification Search
CPC ..... B29C 51/427; B29C 51/421; B29C 51/18; B29C 61/06; B29C 61/0625;
(Continued)

(56) References Cited

U.S. PATENT DOCUMENTS 3,114,931 A * 12/1963 Pelikan ................... B29C 49/48
264/526
5,619,808 A * 4/1997 Pabst ....................... D06C 3/02
34/640
(Continued)

FOREIGN PATENT DOCUMENTS

EP    0 157 403 A2    10/1985
EP    0 336 120 A2    10/1989
(Continued)

OTHER PUBLICATIONS

Ibeh, Christopher C., Thermoplastic Materials, (2011), CRC Press, 1st Ed., pp. 22, 117, 275 (Year: 2011).*
(Continued)

*Primary Examiner* — Francisco W Tschen
*Assistant Examiner* — Edgaredmanuel Troche
(74) *Attorney, Agent, or Firm* — Ostrolenk Faber LLP

(57) ABSTRACT

A method for shaping a preform made from thermoplastic material, and a facility for implementing the method, comprising the following steps: a) providing a preform made from thermoplastic material having a surface; b) supplying thermal energy to the preform by radiation in such a way as to make it ductile; and c) shaping the ductile preform inside
(Continued)

a forming mould. Step b) further involves simultaneously spraying a gaseous fluid onto the surface of the preform in order to preserve the surface.

6 Claims, 1 Drawing Sheet

(51) Int. Cl.
| | |
|---|---|
| *B29B 13/02* | (2006.01) |
| *B29C 35/16* | (2006.01) |
| *B29C 51/00* | (2006.01) |
| *B29C 51/14* | (2006.01) |
| B29C 35/08 | (2006.01) |
| B29L 9/00 | (2006.01) |
| B29K 105/12 | (2006.01) |

(52) U.S. Cl.
CPC .......... *B29C 51/145* (2013.01); *B29C 51/002* (2013.01); *B29C 51/422* (2013.01); *B29C 51/423* (2013.01); *B29C 51/425* (2013.01); *B29C 2035/0822* (2013.01); *B29C 2035/1658* (2013.01); *B29C 2035/1683* (2013.01); *B29C 2791/005* (2013.01); *B29K 2105/12* (2013.01); *B29L 2009/00* (2013.01); *B29L 2009/001* (2013.01)

(58) Field of Classification Search
CPC . B29C 61/0633; B29C 61/0658; B29C 51/02; B29C 51/20; B29C 51/42; B29C 51/44; B29C 51/46; B29C 51/145; B29C 51/165; B29C 51/264; B29C 51/266; B29K 2021/003; B29K 2021/006
See application file for complete search history.

(56) References Cited

U.S. PATENT DOCUMENTS

| | | | |
|---|---|---|---|
| 6,072,158 A | * | 6/2000 | McNally .............. B29B 13/023 |
| | | | 219/388 |
| 2003/0041952 A1 | * | 3/2003 | Mortellite .......... B32B 38/1825 |
| | | | 156/163 |
| 2015/0174798 A1 | * | 6/2015 | Pinto ................... B29C 44/5636 |
| | | | 264/413 |

FOREIGN PATENT DOCUMENTS

| | | | | |
|---|---|---|---|---|
| EP | 0 452 867 A1 | 10/1991 | | |
| WO | WO 03/043799 A1 | 5/2003 | | |
| WO | WO-03043799 A1 * | 5/2003 | ......... | B29C 49/6409 |

OTHER PUBLICATIONS

Quartz Infrared Heater Lamps Catalog PDF Document Retrieved From Internet Archive , (2011), p. 10, Ch. 1.2 (Year: 2011).*
International Search Report dated Jan. 11, 2016 in corresponding PCT International Application No. PCT/FR2015/052510.
Written Opinion dated Jan. 11, 2016 in corresponding PCT International Application No. PCT/FR2015/052510.

* cited by examiner

METHOD FOR HOT-FORMING A THERMOPLASTIC MATERIAL AND IMPLEMENTATION FACILITY

CROSS-REFERENCE TO RELATED APPLICATIONS

The present application is a 35 U.S.C. §§ 371 national phase conversion of PCT/FR2015/052510, filed Sep. 18, 2015, which claims priority to French Patent Application No. 1458839, filed Sep. 18, 2014, the contents of which are incorporated herein by reference. The PCT International Application was published in the French language.

TECHNICAL FIELD

The present invention relates to a method for forming a preform made of thermoplastic material and a facility for implementing it.

BACKGROUND OF THE INVENTION

Methods for forming preforms made of a thermoplastic polymer material, usually called thermoforming, allow three-dimensional pieces to be produced. Thus, there is firstly provided a plate of a thermoplastic material which is made ductile thanks to infrared heating members. Then, the ductile plate is transferred inside a forming die installed in a press and suitable for being able to shape the piece in three dimensions by deforming the ductile plate. Finally, the molded piece is cooled such that the thermoplastic polymer material regains the rigidity thereof, then the piece is ejected from the forming die.

The heating members are installed in an enclosure and the forming die is located downstream of the enclosure in order to be able to sequentially transfer the ductile plates from the enclosure to the forming die while minimizing the energy losses.

In order to decrease the production cost of each of the formed pieces, it is necessary to decrease the manufacturing time of these pieces. Therefore, the limiting step in the sequence of the transformations is that of softening the thermoplastic material. Therefore, there is a drive to increase the power of the heating members such as to, precisely, decrease the time of this step for softening the material in order to obtain a ductile plate. The risk in this case is to promote the oxidization of the surface of the material and, as a result, to degrade the aesthetic appearance of this surface, and in the extreme case, burn it. In addition, there is a risk of the material losing some of the characteristics thereof, particularly mechanical, but also behavioral due to the loss of the additives thereof.

Furthermore, a problem that arises and that the present invention aims to solve is that of providing a forming method which makes it possible to decrease the manufacturing cycle times for thermoformed pieces without however degrading the thermoplastic material from which they are shaped.

SUMMARY OF THE INVENTION

To this end, and according to a first aspect, the present invention proposes a method of forming a preform made of thermoplastic material, comprising the following steps: a) providing a preform made of thermoplastic material having a surface; then providing heat energy by radiation to said preform such as to make it ductile; and, forming said ductile preform inside a forming die. Moreover, at step a), a thermoplastic composite material is provided, and at step b), a gaseous fluid is simultaneously projected at the surface of said preform in order to protect said surface.

Thus, a feature of the invention is the use of a gaseous fluid, for example air, which is projected in the form of a homogeneous stream against the surface of the preform during the heating of the material. Thus, more thermal power is provided while limiting the rise in temperature of the surface. In this way, and in a surprising manner, it is possible to heat the thermoplastic material up to the melting temperature thereof without necessarily oxidizing the surface thereof or burning it. As a result, the time for the rise in temperature of the preform in full is substantially reduced. For example, it is reduced by 50% under conditions in which the preform is relatively thick. Moreover, the surface state of the material shows no degradation or prohibitive signs of oxidation. Since the time for the rise in temperature of the preform is reduced, the forming complete cycle time is reduced just as much, and as a result, the cost for manufacturing the pieces is also thereby reduced.

Thermoplastic composite material means a material comprising a matrix made of a thermoplastic polymer and of a reinforcing element, for example layers of a textile material. The thermoplastic polymer is, for example, a polyamide or a more rigid material, for example polyether ether ketone. The textile material is, for example, made of a glass or carbon fiber woven textile. In this manner, the composite material has a resistance to the deformation under stress, greater than that of a thermoplastic material without reinforcing material.

According to a particularly advantageous method of implementing the invention, between step a) and step b), heat energy is further provided to said preform by conduction, such as to preheat said preform. Thus, thanks to this step of preheating by conduction, upstream of the step of heating by radiation, a substantial amount of heat energy is already supplied to the preform, without degrading the surface thereof. The preform thus reaches a temperature that is substantially less than the melting temperature thereof, such that the surface thereof is not made sticky. In this manner, by combining the two energy supply modes, by conduction and by radiation, the piece manufacturing cycle times are further decreased. Therefore, not only are the cycle times decreased, and therefore the productivity, but in addition, the total amount of energy necessary for forming the preform is decreased.

Advantageously, said gaseous fluid is projected in a direction substantially perpendicular to the surface of said preform. Such an orientation allows a better heat exchange at the surface of the preform, and as a result, allows it to be better protected.

Furthermore, in a preferential manner, said preform is brought into contact with heated plates in order to provide heat energy by conduction to said preform. Thanks to bringing said preform into contact with the heated plates, the possibilities for oxidization of the surface of the material decrease, since the quantity of air, and consequently the quantity of oxygen, is low at the interface. Therefore, the heat energy spreads more quickly by conduction inside the material to reach the core of the preform.

Moreover, and according to a particularly advantageous alternative embodiment, at step b), heat energy is provided by infrared radiation. Infrared radiation means an electromagnetic radiation, the wavelength of which is in the range of the infrared wavelengths, between those corresponding to the visible light and those of the microwaves. In this manner, the preform is quickly and easily heated. Preferentially, the infrared radiation emits in the range of the short wavelengths, and of low inertia.

Preferentially, at step b), said gaseous fluid is air. Air is indeed advantageous since it has an advantageous cost. Thus, as will be explained hereafter, under some circumstances, an inert gaseous fluid is required to further lessen the phenomenon of oxidation of the surface of the preform made of polymer material.

According to another aspect, the present invention relates to a facility for forming a preform made of thermoplastic material, comprising, firstly, a radiation heating enclosure for receiving a preform made of thermoplastic material such as to be able to provide heat energy by radiation to said preform to make it ductile, and secondly, a forming die located downstream of said heating enclosure in order to be able to form said ductile preform. The facility further comprises a gaseous fluid projecting device installed inside said radiation heating enclosure in order to be able to project said gaseous fluid at the surface of said preform, when said preform receives heat energy by radiation, such as to protect the surface of said preform.

Such a facility for implementing the method as described above provides identical advantages therewith. Preferably, the device for projecting the gaseous fluid is orientated in a direction substantially perpendicular to the surface of the preform. Thus, a turbulent gaseous fluid flow is obtained at the surface of the preform, which makes it possible to further protect the surface.

Advantageously, it comprises a conduction heating device located upstream of said radiation heating enclosure in order to be able to provide heat energy to said preform by conduction. Preferentially, said conduction heating device comprises heated plates intended to come into contact with said preform in order to provide heat energy by conduction to said preform. Thus, the heated plates are movable relative to each other between a position of being spaced from one another in order to receive the preform made of thermoplastic material and a position of being brought close to each other where they press against the preform. Therefore, the latter is taken between the heated plates, in a space with a limited presence of air, or a confined space if necessary, deprived of air by means of evacuation for example.

Moreover, said radiation heating enclosure comprises infrared emission lamps.

BRIEF DESCRIPTION OF THE DRAWINGS

Other features and advantages of the invention will emerge upon reading the following description of a specific embodiment of the invention, which embodiment is given indicatively but in a nonlimiting manner, with reference to the appended drawings wherein:

FIGS. 1A, 1B and 1C illustrate three successive stations for processing a preform made of thermoplastic material.

DESCRIPTION OF PREFERRED EMBODIMENTS

Figure 1A:
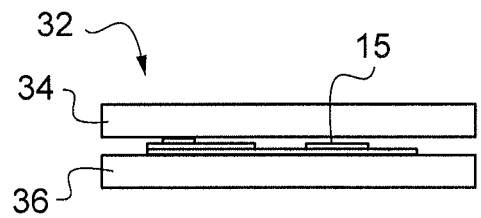
FIG. 1A is a schematic view of a first station of a facility for forming a preform made of composite material in accordance with the invention.
Figure 1B:
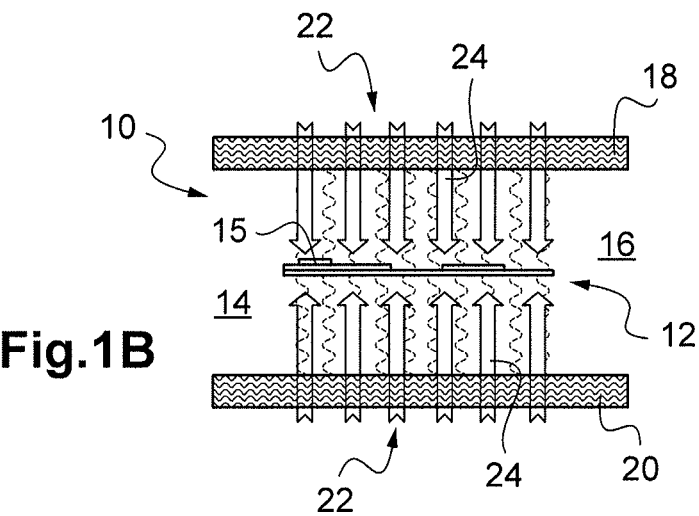
FIG. 1B is a schematic view of a second station of the facility following the first station shown in FIG. 1A.

Reference will be made firstly to FIG. 1B schematically showing a heating enclosure 10, which forms an essential processing station of the method according to the invention. It comprises a processing space 12, which has an inlet 14 and an opposite outlet 16. Inside the processing space 12, a thermoplastic composite preform 15 is held horizontally in a fixed position. The preform 15 has, in this case, parts of various thicknesses. The heating enclosure 10 has, in the upper part thereof, upper infrared radians 18, located at the top of the processing space 12 and orientated towards the latter. It also has in the lower part thereof, below the processing space 12, lower infrared radians 20 also orientated towards the space. In addition, the heating enclosure 10 includes a gaseous fluid projecting device 22 for projecting the gaseous fluid through the infrared radians 18, 20 towards the inside of the processing space 12 in the direction of the preform 15. The projecting device 22 includes, for example, injection nozzles 24 extending between the elements of the infrared radians 20, 18. In this case, the gaseous fluid projected through the device 22 is air.

Figure 1C:
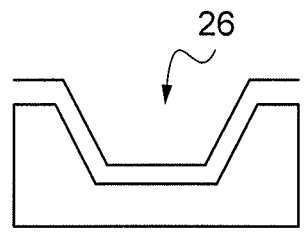
FIG. 1C is a schematic view of a third station of the facility following the second station shown in FIG. 1B; and, FIG. 2 is a schematic view illustrating phenomena observed at the facility second station shown in FIG. 1B.

Downstream of the heating enclosure 10 is, shown schematically in FIG. 1C, a forming die 26 for receiving the preform 15 made of thermoplastic composite as will be explained hereafter.

Thus, the preform 15 made of thermoplastic composite has, for example, a polyamide 6, or polyamide 6.6, matrix, and textile reinforcing layers, for example, made of glass fiber or carbon fiber. The preform 15 is in the general shape of a plate, or a multi-thickness layered preform, which is not strengthened, and is held in a fixed position inside the processing space 12 on a perforated platform that is not shown. A multi-thickness preform has zones of various thicknesses.

In this manner, infrared radians 18, 20 provide heat energy by radiation to the preform 15 on the two opposite faces thereof.

Figure 2:
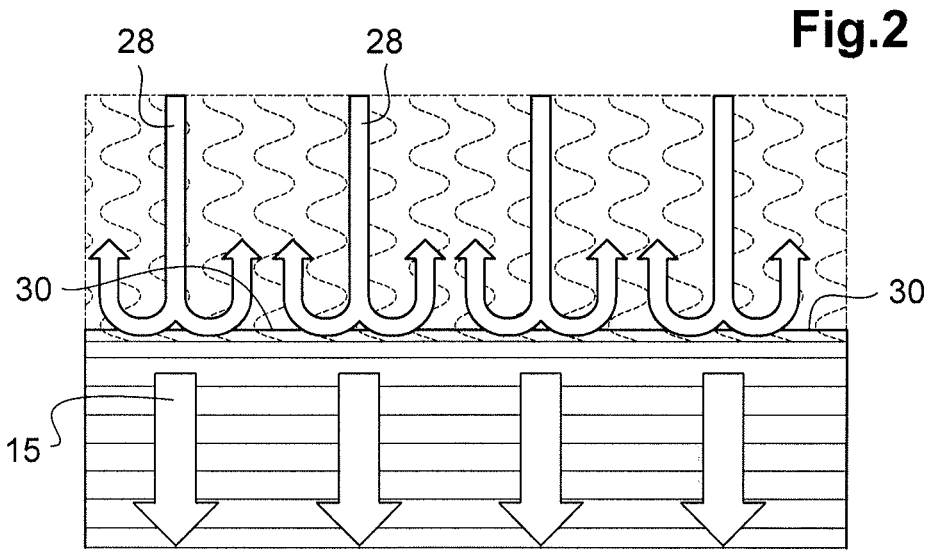

As illustrated in greater detail in FIG. 2, the radiation penetrates through the surface 30 of the preform 15, into the surface layers thereof, over a thickness of approximately a few micrometers, or more, and then the heat energy is transmitted by conduction inside the preform 15 to reach the core of the material.

The intensity of the infrared radians 18, 20 is adjusted such as to be able to bring the temperature of the material of the preform 15 substantially beyond the melting temperature thereof. At the same time, air is injected through the elements of infrared radians 20, 18 in a stream 28 orientated substantially perpendicular to the surface 30 of the preform 15. To achieve this, the facility according to the invention comprises air injection nozzles located between the radians. These air injection nozzles are orientated towards the preform 15, and they are fed using a compressed air network for example.

The projected air is initially at ambient temperature, and it makes it possible to cool the surface 30 of the composite preform 15 such as to reduce the oxidation of the material, without hindering the action of the infrared radiation through the surface layer. According to an alternative embodiment of the invention, the ambient air is not projected, but a nitrogen neutral gas, such as to expel the air and, as a result, eliminate the presence of oxygen at the surface 30 of the preform 15. In this manner, the possibilities for oxidation of the material are further reduced.

Thus, through the power of the infrared radians 18, 20, for transmitting the maximum possible heat energy to the composite material, and the action of the projected air that makes it possible to protect the surface 30 of the preform 15, the thermoplastic material is softened and made ductile within extremely short time periods without affecting the surface thereof.

Advantageously, in the case of a multi-thickness preform, the intensity of the infrared radians 18, 20 is regulated by measuring the surface 30 temperature of the preform 15 on the zone of lesser thickness. In this manner, it is possible to heat the thermoplastic material up to the melting temperature thereof without degradation thereof. Thus, it is possible to decrease by approximately 50% the heating times compared to the solutions according to prior art and it is possible to process composites having various thicknesses and particularly large thicknesses.

After the material of the preform 15 has been brought to a temperature greater than the melting temperature thereof, in a homogeneous manner, the preform is removed from the heating enclosure 10 through the outlet 16 so that it can be inserted directly inside the forming die 26. The preform 15 is then formed and subsequently cooled using a well-known implementation method, in order to provide a rigid composite piece.

According to a particularly advantageous method of implementing the invention, the preform 15 is preheated by conduction before being inserted inside the heating enclosure 10. Thus, the facility according to the invention comprises, upstream of the heating enclosure 10, as shown in FIG. 1A, a conduction heating device 32. The latter comprises two heating plates 34, 36 parallel and movable between a position of being spaced apart from one another and a position of being brought close to one another in which they sandwich the multi-thickness preform 15. The heating plates 34, 36 are made of metal and are, for example, provided with electric resistors. Furthermore, they can be preformed to closely fit the entire surface of the preform 15 and preheat it homogeneously.

In this conduction preheating stage for the preform 15, a large amount of heat energy is supplied throughout the material, and particularly when the preform has a large thickness, in particular with unstrengthened plies. Indeed, conduction is promoted by limiting the air spaces between plies, thanks to the slight pressure of the heating plates 34, 36. These are, of course, brought to a temperature less than the melting temperature of the thermoplastic material. This not only makes it possible to prevent adhesion, between the plates 34, 36 and the material of the preform 15, but moreover, to not promote the oxidation of the surface 30. For example, for a multi-thickness preform of a polyamide-based composite material and with a maximum thickness of 3.5 mm, thanks to the heating plates 34, 36, the preform 15 is preheated to a temperature of 180° C. in 60 seconds.

Although the preform 15 can have parts of various thicknesses, there is no need to have heating plates 34, 36 fitting the shape of the preform 15. This is indeed due to the fact that the heating plates 34, 36 are in contact with the parts of greater thickness, and consequently, will promote the preheating throughout these parts, while the parts of lesser thickness will be easily brought to core temperature later, and more particularly in the heating enclosure 10.

Thus, after having been preheated, the preform 15 is transferred inside the heating enclosure 10, in order to be softened in accordance with the arrangements indicated above. Although the temperature of the preform 15 tends to decrease during this transfer, only the surfaces are affected and the infrared radiation of the heating enclosure 10 makes it possible to heat them quickly again. At the end of passing inside the heating enclosure 10, the preform 15 has a temperature that is substantially higher than the melting temperature thereof and homogeneously distributed in all of the parts thereof despite possible differences in thickness.

Thus, for example, the preform 15 is brought from 180° C. to 250° C. inside the heating enclosure 10 during a period less than 60 seconds. The time spent inside the heating enclosure 10 is thus reduced as it is a matter of supplying heat energy such that the material of the preform 15 gains a few dozen additional degrees. As a result, the time of exposing the material to the infrared radiation is reduced and therefore, even more so, the risks of oxidation of the surface.

The preform 15 can then be transferred inside the forming die 26. Thus, thanks to the facility according to the invention, the thermoforming cycle times are decreased, for example for a multi-thickness preform of a polyamide-based composite material, with a maximum thickness of 3.5 mm and with a minimum thickness of 1 mm, and the cycle time can be approximately 60 seconds.

It will be observed that the method, in accordance with the invention, can also be used for forming thermoplastic materials in general.

The invention claimed is:

1. A method of forming a preform made of thermoplastic material, comprising the following steps:
   a) at a first station, preheating a preform to a temperature below the preform's melting temperature by conduction heating with heated plates, the preform being made of a thermoplastic composite material;
   b) transferring the preheated preform to a processing space at a second station and holding the preheated preform in a fixed position inside the processing space, said preheated preform having a surface;
   c) providing heat energy by radiation through said surface of said preheated preform to bring a temperature of the preform beyond its melting temperature to make said preheated preform ductile; and,
   d) forming said ductile preform inside a forming die at a third station;
   wherein at step c), a gaseous fluid, that is at ambient temperature, is simultaneously projected at said surface of said preheated preform to cool down said surface in order to protect said surface without hindering heating to bring the temperature of the preheated preform beyond its melting temperature to make said preheated preform ductile by radiation through said surface, and
   wherein, during step c), the gaseous fluid is provided to prevent burning of the preheated preform by oxidation.

2. The forming method as claimed in claim 1, wherein said gaseous fluid is projected in a direction perpendicular to the surface of said preform.

3. The forming method as claimed in claim 1, wherein, at step c), heat energy is provided by infrared radiation.

4. The forming method as claimed in claim 1, wherein, at step c), said gaseous fluid is air.

5. The forming method as claimed in claim 1, wherein said gaseous, unheated fluid is a neutral gas that protects said surface against oxidation.

6. The forming method as claimed in claim 5, wherein said neutral gas is nitrogen.

* * * * *